FIG. 1
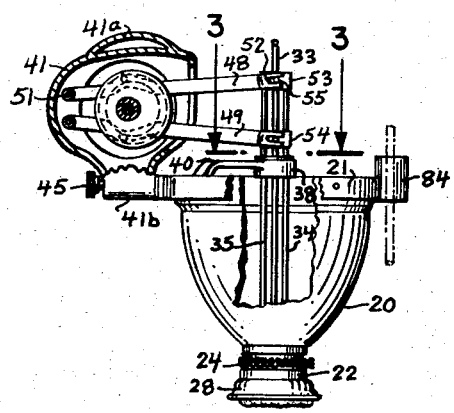
FIG. 2
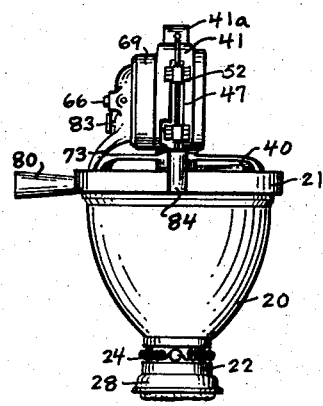
FIG. 3
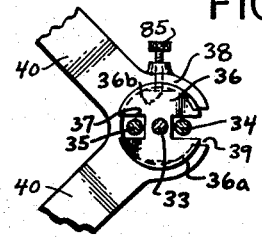
FIG. 4
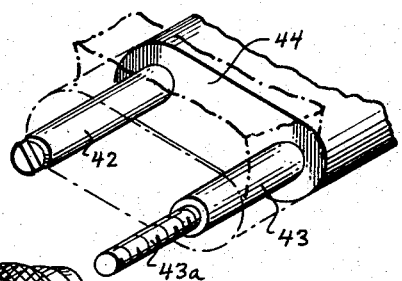
FIG. 5
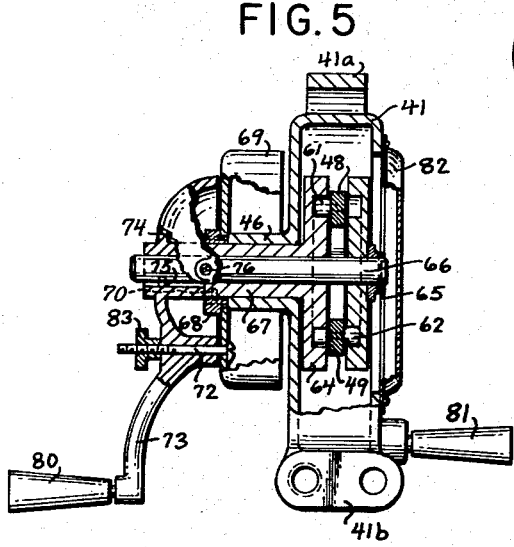
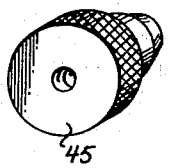
FIG. 6
INVENTOR.
THOMAS E. BELSHAW
BY Barnes + Seed
ATTORNEYS Jan. 3, 1967  T. E. BELSHAW  3,295,468

DOUGH FORMING MACHINE

Filed Oct. 16, 1962  2 Sheets-Sheet 2

INVENTOR.
THOMAS E. BELSHAW
BY Barnes & Seed
ATTORNEYS

United States Patent Office 3,295,468
Patented Jan. 3, 1967

3,295,468
DOUGH FORMING MACHINE
Thomas E. Belshaw, 1772 22nd Ave. S.,
Seattle, Wash. 99204
Filed Oct. 16, 1962, Ser. No. 230,920
1 Claim. (Cl. 107—14)

The present invention relates to improvements in dough forming machine of the general type shown in United States Patent No. 3,003,439, and namely one in which a charge of dough is drawn from a hopper into a cylinder responsive to the down stroke of a forming piston, is extruded between the forming piston and the discharge end of the cylinder by the action of the plunger, and is cut off in doughnut ring form during the return stroke of the forming piston.

One of the principal objects of the invention is to provide an improved arrangement whereby various sizes of forming pistons can be conveniently employed with a given hopper assembly to vary the hole size of the doughnuts.

A further object is to provide an improved mounting arrangement whereby the drive mechanism for the plunger and forming piston is carried by the hopper.

In carrying out the above and other objects the invention also aims to provide a device which can be readily cleaned and maintained in a sanitary condition.

With yet additional objects and advantages in view which, with the foregoing, will appear and be understood in the course of the following description and claim, the invention consists in the novel construction and in the adaptation and combination of parts hereinafter described and claimed.

In the accompanying drawings:

FIGURE 1 is a side elevational view of my dough forming machine with part of the hopper and cam case broken away.

FIG. 2 is a front elevational view of the machine.

FIG. 3 is a fragmentary horizontal sectional view to an enlarged scale taken along the line 3—3 of FIG. 1.

FIG. 4 is a detail fragmentary perspective view, partly exploded, showing the mounting arrangement for the cam case (shown in phantom) on the hopper mounting ring.

FIG. 5 is an enlarged transverse vertical sectional view through the cam drive assembly and looking rearwardly toward the root ends of the cam levers.

FIG. 6 is a fragmentary side elevational view of the cam case assembly as seen from the right when facing forwardly toward the hopper.

Figure 9:
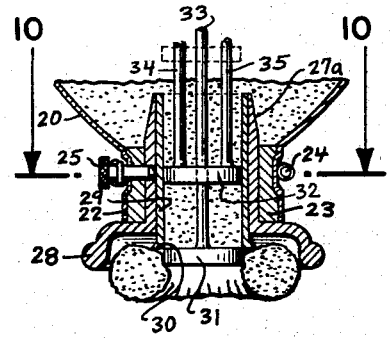
FIG. 9 is an enlarged vertical sectional view showing the lower end portion of the hopper assembly at the time of dough ring cut-off.
Figure 10:
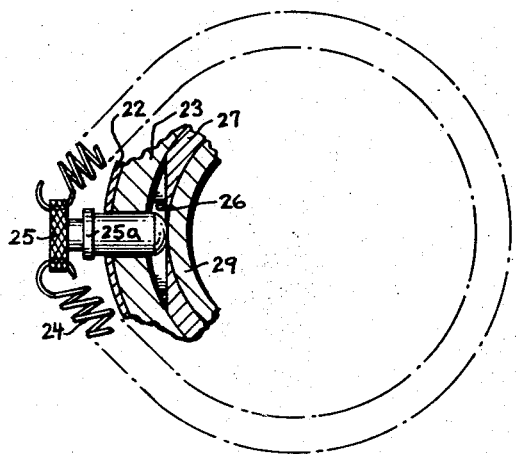
FIG. 10 is a detail fragmentary sectional view taken as indicated by the line 10—10 of FIG. 9.

Referring more particularly to the drawings, a dough hopper 20 is provided having a mounting ring 21 secured at the top and a cylindrical extension 22 at the bottom sleeved onto a bushing 23. This bushing has an external circumferential groove into which the overlying portion of the extension is pressed so that the hopper and bushing are fixed together as a unit and present a circumferential groove in the outside of the extension 22. The resulting retaining groove (FIG. 9) in the extension 22 is occupied by a removable spring-ring 24. This ring has its ends looped through diametrically spaced openings in the knurled head of a lock pin 25 which passes through registering holes in the extension 22 and bushing 23 to interfit with a chordal groove 26 cut in the periphery of a sleeve comprising the neck 27 of a guard unit. This neck 27 extends from the top of an upwardly dished guard 28 and has press-fitted therein a bushing 29 which projects downwardly to terminate in a flared cut-off portion 30 in turn skirted by the guard to coact with a forming piston 31. The groove 26 is cut through the wall of the neck 27 such that the floor of the groove is tangential to the bushing 29.

It will be noted that at its upper end 27a the neck 27 is externally tapered and that the inner end of the lock pin 25 is beveled. This causes the pin 25 to retract against the force of the spring-ring 24 as the pin is engaged by the head of the guard unit during insertion of the latter into the lower end of the hopper through the bushing 23. Inward travel of the lock pin before the guard unit is introduced is limited by an intermediate flange 25a on the pin. After insertion of the guard unit it is turned relative to the hopper until the groove 26 is brought into registry with the pin 25 thereby locking the guard unit in place. Removal of the guard unit is readily effected by merely turning it to force retraction of the pin by the resultant wiping of the tip of the pin by the floor of the groove 26 until the groove is turned beyond the pin whereupon the guard unit is free to be axially withdrawn. Thus neither insertion nor removal of the guard unit necessitates handling of the lock pin. At the same time the pin and related spring-ring can be readily removed at any time for cleaning of the machine.

A rod 33 carries the forming piston 31 and passes upwardly through a plunger 32 which in turn is mounted on a pair of rods 34–35. The three rods 33, 34 and 35 continue through the hopper and are slidably received by a round bearing block 36, the rods 34–35 in longitudinal grooves 37 and the rod 33 in a center bore. At the top the bearing block has a rim flange 36a which seats upon a hub 38 having a longitudinal access slot 39 to its bore made wider than the diameter of the rods 33–35. Radiating as integral supports from this hub 38 to the ring 21 is a pair of spoke arms 40.

Figure 11:
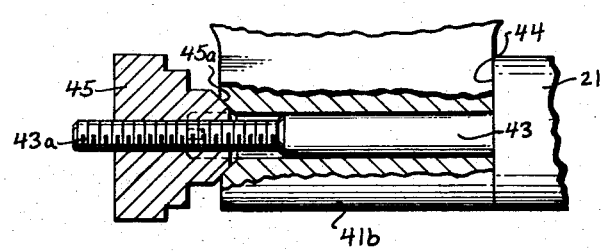
FIG. 11 is a detail sectional view illustrating the action of the lock nut for holding the cam case on the mounting ring of the hopper.

An oblong cam case 41 with a handle 41a at the top has a base 41b supported by the ring 21, but made detachable by dowels 42–43 projecting outwardly into openings through the base from a tangential mounting face 44. The dowel 42 has a fairly close fit with its opening in the base 41b whereas the dowel 43 has a loose fit with its opening and has a threaded neck 43a for receiving a knurl-headed nut 45. It will be noted that the base of this nut and the mouth of the respective dowel opening are tapered as indicated at 45a in FIG. 11. This arrangement assures an accurate and firm seating of the cam case 41 on the mounting ring 21 of the hopper while giving ease of assembly.

Above its base the case 41 is hollow and has an assembly access opening at one side, a boss extension 46 at the other side, and a vertical slot 47 for cam levers 48–49 at its inner end facing the center axis of the hopper. These cam levers 48–49 have lateral terminal bosses at one end for receiving pivot pins 51 which traverse the cam case and have their other ends forked at 52 to straddle blocks 53–54. The latter are rigidly mounted, respectively, on the upper ends of the plunger rods 34–35 and centrally of piston rod 33. Block 53 has a center bore for slidably receiving the piston rod 33 and block 54 has vertical bores through which the plunger rods 34–35 operate. It will be noted that the individual forks 52 of the cam levers are in turn bifurcated to interfit with pins 55 projecting laterally from the blocks 53–54.

Figure 7:
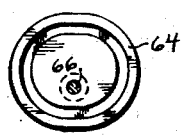
FIG. 7 is a detail elevational view of the grooved working face of one of the cams.
Figure 8:
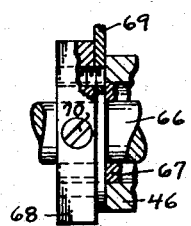
FIG. 8 is a detail side elevational view of the dial hub and related parts.

Continuing to the operation of the cam levers, such have opposite vertical bends from which project opposite journaled rollers 61-62 for riding in the opposed grooves of cams 63-64, hereinafter respectively designated as the shaft cam and the sleeve cam. The first of these is pinned at 65 to a shaft 66 which receives a sleeve extension 67 of the other cam 64, such extension in turn being journaled in the boss extension 46 of the case. A generally rectangular dial hub 68 is screw mounted near diagonally opposite corners to the front face of a rearwardly dished dial plate 69 and is keyed on a free end portion of the sleeve extension 67 which projects beyond the cam case. As indicated in FIG. 8, a set screw 70 is threaded longitudinally of the dial hub to seat against the sleeve extension. Thus it is seen that the dial plate 69, dial hub 68, and sleeve cam 64 are tied together for unitary turning action.

It will be noted that the dial plate 69 has an arcuate slot 71 for an adjusting bolt 72 carried by a crank 73 whose hub 74 is keyed to the shaft 66 at 75 and is locked thereto by a set screw 76. The crank hub 74 is given a forwardly dished effect formed with a pointer 77 at the rim opposite the crank arm for registering with a scale 78 on the dial plate. Handles 80-81 are mounted on the crank 73 and the opposite side of the cam case, and the case access opening is closed after assembly of the device by a cover 82. It will also be noted that a knurled nut 83 is provided on the bolt 72 for locking the dial plate 69 to the crank 73 after adjustment of the cams 63-64, such being effected merely by turning the crank while restraining the dial plate. As can be seen in FIG. 1, a boss 84 is provided on the mounting ring 21 opposite from the cam case so that the assembly may be readily mounted.

In FIG. 3, the bearing block 36 is formed with a chordal flat 36b for engagement by a set screw 85 which is threaded through the wall of the hub 38. To install the plunger and piston rod assembly on the hopper with the set screw 85 in backed off position, the forming piston 31 and plunger are lowered into the hopper to a level lower than the hub 38 and their rods 33-35 are moved sideways through the hub's access slot 39 while the bearing block 36 is held above the hub. Then the bearing block is lowered to seat by its flange 36a on the hub and the set screw 85 is tightened against the bearing block flat 36b. Assembly of the machine is completed by sliding the cam case and related driving mechanism onto the dowels 42-43 while interfitting the forked ends of the cam levers 48-49 over the blocks 53-54 and related pins 55, and then screwing the nut 45 onto the head of the dowel 43.

The machine is operated merely by turning of the crank 73 after filling of the hopper with dough. At the start of each cycle of the machine the forming piston enters the guard bushing 29 and as it continues toward the discharge end dough is drawn out of the hopper. During this suction stroke the ring of dough surrounding the upper projecting portion of the guard neck 27 prevents air from being drawn into the hopper from between the guard and the bushing 23. The forming piston then leaves the lower end of the bushing 29 and dough is extruded around the forming piston by the continuing down stroke of the plunger 32. The resulting ring of dough is cut off by the forming piston 31 and cut-off portion 30 of the guard bushing during the return stroke of the piston.

Of course the size of the center hole in the formed dough ring is dependent upon the diameter of the forming piston. Accordingly, when a different hole size is desired the operator need only change the plunger and forming piston assembly and substitute a guard unit having the respective inside diameter. Removal of the guard unit is readily accomplished as aforedescribed.

It is thought that the invention will have been clearly understood from the foregoing detailed description. Changes within the spirit of my teachings may be resorted to without departing from the invention and it is accordingly my intention that the hereto annexed claim be given a scope in their construction fully commensurate with the broadest interpretation to which the employed language admits.

What I claim is:

In a dough forming machine, a hopper assembly with a discharge extension having a radial opening therethrough, a removable sleeve mounted in said extension and having an external circumferential groove therein at the same level as said opening and extending less than the circumference of the sleeve, an enlarged guard fixed on the sleeve and extending radially beyond the lower end of the extension, a removable pin slidably extending through said opening into said groove, the inner end of said pin being tapered and said pin having a stop shoulder opposing the outer face of said extension and arranged to prevent inward travel of the tapered inner end portion of the pin beyond the inside radius of said sleeve and means engaging said extension and yieldingly resisting withdrawal of said pin from said groove, the end portion of the floor of said groove and the inner end portion of said pin being so shaped that turning of said guard relative to said extension causes said pin to back out of said groove onto the non-grooved portion of the sleeve in opposition to said means thereby freeing the sleeve for axial removal from the extension, and the upper end of said sleeve being externally tapered inwardly toward the top above said groove for engaging the inner end of said pin when the sleeve is being inserted into said hopper extension to thereby retract the pin from the inside of the extension until said groove reaches the level of the pin.

References Cited by the Examiner

UNITED STATES PATENTS

| 333,587 | 1/1886 | Beatty | 251—360 X |
|---|---|---|---|
| 1,738,033 | 12/1929 | Belshaw. | |
| 1,811,654 | 6/1931 | Schoel. | |
| 1,866,061 | 7/1932 | Schoel. | |
| 2,276,885 | 3/1942 | Sherlock. | |
| 2,431,268 | 11/1947 | McIntyre | 285—317 |
| 2,449,920 | 9/1948 | Williams | 285—305 X |
| 2,571,653 | 10/1951 | Bastien. | |
| 2,643,621 | 6/1953 | Belshaw. | |
| 3,003,439 | 10/1961 | Belshaw | 107—14 |

ROBERT E. PULFREY, Primary Examiner.

J. D. BEIN, Examiner.